US009547507B2

(12) United States Patent
Lin et al.

(10) Patent No.: US 9,547,507 B2
(45) Date of Patent: Jan. 17, 2017

(54) PROGRAM STARTUP METHOD, APPARATUS AND TERMINAL (71) Applicant: Tencent Technology (Shenzhen) Co., Ltd., Shenzhen, Guangdong (CN)

(72) Inventors: Daozheng Lin, Guangdong (CN); Tingli Bi, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/815,436

(22) Filed: Jul. 31, 2015

(65) Prior Publication Data

US 2015/0339134 A1 Nov. 26, 2015

Related U.S. Application Data (63) Continuation of application No. PCT/CN2014/079240, filed on Jun. 5, 2014.

(30) Foreign Application Priority Data

Jun. 5, 2013 (CN) .......................... 2013 1 0221076

(51) Int. Cl.
*G06F 9/445* (2006.01)
*G06F 9/44* (2006.01)
*G06F 9/48* (2006.01)

(52) U.S. Cl.
CPC ........... *G06F 9/44505* (2013.01); *G06F 9/445* (2013.01); *G06F 9/4406* (2013.01); *G06F 9/4843* (2013.01)

(58) Field of Classification Search
None
See application file for complete search history.

(56) References Cited

U.S. PATENT DOCUMENTS 6,237,032 B1 * 5/2001 Scoville .............. G06F 11/0757
709/220
7,275,150 B2 * 9/2007 Pagan ..................... G06F 9/445
713/1

(Continued)

FOREIGN PATENT DOCUMENTS

CN       101046748 A      10/2007
CN       101989236 A       3/2011

(Continued)

OTHER PUBLICATIONS

Office Action dated Dec. 28, 2015 for corresponding Chinese Application No. 201310221076.2, 6 pages.

(Continued)

*Primary Examiner* — Kim Huynh
*Assistant Examiner* — Paul J Yen
(74) *Attorney, Agent, or Firm* — Brinks Gilson & Lione (57) ABSTRACT A program startup method, apparatus and terminal are provided. The method includes: determining at least one target program from programs according to history startup information of the plurality of programs in a prefetch database, where the history startup information comprises startup moments of the plurality of programs; loading prefetch data corresponding to the target program into internal memory and locking the prefetch data in startup of an automatic startup item of an operating system; unlocking the prefetch data corresponding to the target program in the case where a startup event of the target program is detected; accessing the prefetch data corresponding to the target program in the internal memory; and running code of the target program according to the prefetch data corresponding to the target program to start up the target program.

13 Claims, 3 Drawing Sheets (56) References Cited

U.S. PATENT DOCUMENTS

| | | | |
|---|---|---|---|
| 2002/0037753 A1* | 3/2002 | Shitahaku | H04M 1/72522 |
| | | | 455/566 |
| 2008/0082812 A1* | 4/2008 | Kirshenbaum | G06F 9/4401 |
| | | | 713/2 |
| 2008/0301399 A1 | 12/2008 | Yasue et al. | |
| 2011/0099313 A1 | 4/2011 | Bolanowski | |
| 2012/0054516 A1* | 3/2012 | Shayer | G06F 1/3225 |
| | | | 713/320 |
| 2012/0102309 A1 | 4/2012 | Lin et al. | |
| 2012/0179728 A1* | 7/2012 | Harris | G06F 17/30297 |
| | | | 707/803 |

FOREIGN PATENT DOCUMENTS

| | | |
|---|---|---|
| CN | 102591770 A | 7/2012 |
| CN | 102999368 A | 3/2013 |
| CN | 103309740 A | 9/2013 |

OTHER PUBLICATIONS

International Search Report and Written Opinion received in PCT Application No. PCT/CN2014/079240 dated Sep. 22, 2014.

* cited by examiner

FIG. 1

FIG. 2

PROGRAM STARTUP METHOD, APPARATUS AND TERMINAL

CROSS-REFERENCE AND RELATED APPLICATIONS

This application is a continuation of PCT/CN2014/079240, filed on Jun. 5, 2014 and titled "PROGRAM STARTUP METHOD, APPARATUS AND TERMINAL", which claims priority to Chinese Patent Application No. 201310221076.2, titled "PROGRAM STARTUP METHOD, APPARATUS AND DEVICE", filed with State Intellectual Property Office of PRC on Jun. 5, 2013, which are incorporated herein by reference in their entireties.

FIELD

The present disclosure relates to the field of computer technology, and in particular to a program startup method, apparatus and a terminal.

BACKGROUND

With the development of computer technology and Windows technology, data used in the startup of frequently used programs in a computer may be pre-loaded into internal memory after an operating system of the computer starts up, in order to accelerate the startup or operation of the frequently used programs.

A program may be started up directly according to loaded data in the internal memory without loading the same data from a disk when the computer operates, thereby reducing disk I/O (Input/Output) of the system and accelerating the operation of the system or program.

There may be various programs being started up when the operating system operates. Every time one program is started up, the data corresponding to the program has to be loaded into the internal memory. In the case that the pre-loaded data occupies too much internal memory space, the loaded data have to be removed or destroyed to load the data corresponding to the programs to be run, to ensure normal operation of the programs. Hence, the above removed data or destroyed data has to be re-read from the disk when the programs corresponding to the removed data or destroyed data are started up. Therefore, the acceleration of the operation of the system may not be achieved and the operation performance of the system may be deteriorated.

SUMMARY

According to the embodiments of the present disclosure, a program startup method, apparatus and terminal are provided.

In an embodiment of the present disclosure, there is provided a program startup method including:
  determining at least one target program from programs according to history startup information of the programs in a prefetch database, where the history startup information includes startup moments of the programs;
  loading prefetch data corresponding to the target program into internal memory and locking the loaded data in startup of an automatic startup item of an operating system;
  unlocking the prefetch data corresponding to the target program in the case where a startup event of the target program is detected;
  loading the prefetch data corresponding to the target program from the internal memory; and
  running code of the target program according to the prefetch data corresponding to the target program to start up the target program.

In an embodiment of the present disclosure, there is provided a program startup apparatus including at least one processor and a memory having processor-executable instructions stored therein, and the instructions when executed by the at least one processor, configure the program startup apparatus to:
  determine at least one target program from a plurality of programs according to history startup information of the plurality of programs in a prefetch database, wherein the history startup information includes startup moments of the plurality of programs;
  load prefetch data corresponding to the at least one target program into internal memory and lock the prefetch data in startup of an automatic startup item of an operating system;
  unlock the prefetch data corresponding to the at least one target program in the case where a startup event of the at least one target program is detected;
  load the prefetch data corresponding to the at least one target program from the internal memory; and
  run code of the at least one target program according to the prefetch data corresponding to the at least one target program to start up the at least one target program.

In an embodiment of the present disclosure, there is provided a terminal including a (non-transitory computer-readable storage) memory and a program,
  where the program is stored in the memory, and a processor is configured to implement a at least one program startup method by executing the program;
  where the program startup method includes:
  determining at least one target program from programs according to history startup information of the plurality of programs in a prefetch database, wherein the history startup information includes startup moments of the plurality of programs;
  loading prefetch data corresponding to the at least one target program into internal memory and locking the loaded data in startup of an automatic startup item of an operating system;
  unlocking the prefetch data corresponding to the at least one target program when a startup event of the at least one target program is detected;
  loading the prefetch data corresponding to the at least one target program from the internal memory; and
  running code of the at least one target program according to the prefetch data corresponding to the at least one target program to start up the at least one target program.

In an embodiment of the present disclosure, there is provided a non-transitory storage medium including computer executable instructions, where the executable instructions are configured to implement a program startup method, and the method includes:
  determining at least one target program from programs according to history startup information of the plurality of programs in a prefetch database, wherein the history startup information comprises startup moments of the plurality of programs;
  loading prefetch data corresponding to the at least one target program into internal memory and locking the prefetch data in startup of an automatic startup item of an operating system;

unlocking the prefetch data corresponding to the at least one target program in the case where a startup event of the at least one target program is detected;

accessing the prefetch data corresponding to the at least one target program in the internal memory; and running code of the at least one target program according to the prefetch data corresponding to the at least one target program to start up the at least one target program.

According to the method, apparatus and terminal provided in the present disclosure, the at least one target program which requires prefetch data is determined according to the history startup information, and the prefetch data of the at least one target program is preferably loaded into the internal memory in advance, so that the prefetch data is directly accessed from the internal memory when the at least one target program is started up, thereby avoiding a large number of disk I/O, reducing a startup time of the at least one target program and accelerating the startup of the at least one target program. Moreover, it is ensured that the prefetch data is not removed or destroyed by locking the loaded data when an operating system operates.

BRIEF DESCRIPTION OF THE DRAWINGS

The accompanying drawings needed to be used in the description of the embodiments are described briefly as follows, so that the technical solutions according to the embodiments of the present disclosure become clearer. It is obvious that the accompanying drawings in the following description are only a few of embodiments of the present disclosure. For those skilled in the art, other accompanying drawings may be obtained according to these accompanying drawings without any creative work.

DETAILED DESCRIPTION

The embodiments of the present disclosure are described in further detail as follows in conjunction with the accompanying drawings to make the object, technical solutions and advantages of the present disclosure to be clearer.

Figure 1:
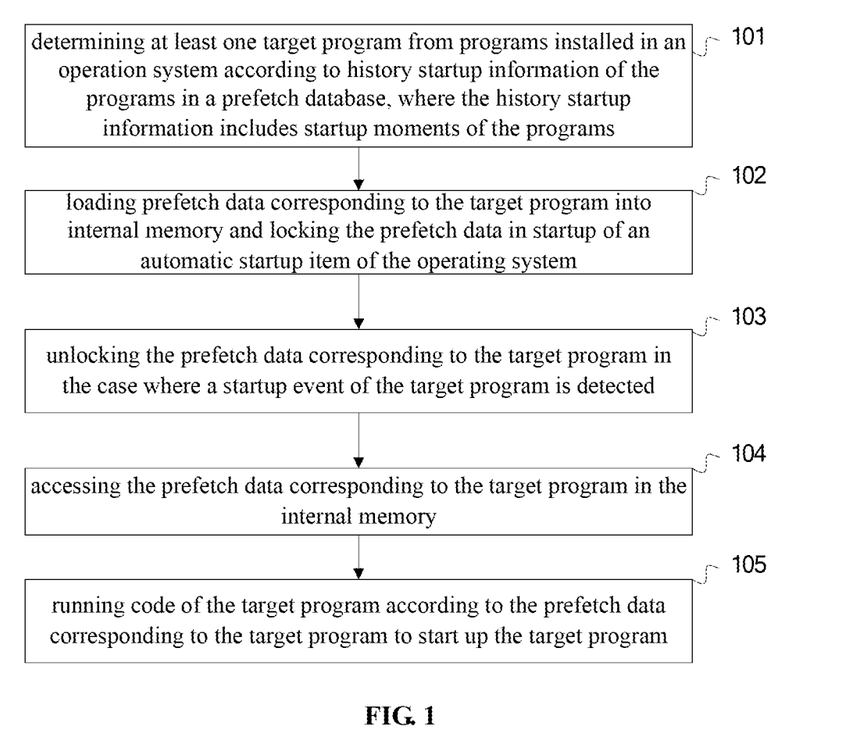
FIG. 1 is a flowchart of a program startup method according to an embodiment of the present disclosure.

FIG. 1 is a flowchart of a program startup method according to an embodiment of the present disclosure. The executive body of the program startup method according to the embodiment of the present disclosure may be a terminal device. Referring to FIG. 1, the method includes Steps 101 to 105.

Step 101 may include determining at least one target program from programs installed in an operation system according to history startup information of the programs in a prefetch database, where the history startup information includes startup moments of the programs.

The embodiment of the present disclosure may be applied during starting up the operating system of the terminal device. The programs are installed in the operating system. Each of the programs may either be an application program, or be a background program or process or the like which has to be started up when the operating system operates, which is not limited herein. The startup moment of a program may be referred to a relative moment with a start up moment of the terminal device as a zero time. For example, program A starts up at 25 s after the terminal device starts up, the startup moment of the program A is the $25^{th}$ second.

It should be noted that the history startup information included in the prefetch database may further include the startup moments of the program started up in several times of operations of the terminal device. The terminal device stores the startup moments of the program into the prefetch database every time the program starts up.

The target program, which requires prefetch data daring starting up the operating system, is determined according to the history startup information of the programs which are installed in the operating system. Because the startup moments of the programs are included in the prefetch database, the number of times the programs start up may be obtained based on the startup moments. The program whose number of times of startup more than a preset times threshold may be determined as the target program. Alternatively, a preset number of target programs may be determined as the target programs according to a descending order of the number of times the programs start up. As described above, only the number of times of startup of a program is taken as a criterion for determining the target program. However, in fact, a startup frequency of a program, an actual startup moment of a program or the like may be obtained according to the history startup information recorded in the prefetch database. The target program may also be determined from the combination of the startup moment, the startup frequency and the actual startup moment, which is not limited herein.

The Step 101 may be performed during the startup of the operating system to determine the target program which requires the prefetch data in this startup. Alternatively, the Step 101 may also be performed when the operating system shuts down to determine the target program which requires the prefetch in a next startup of the operating system.

Step 102 may include loading prefetch data corresponding to the target program into internal memory and locking the prefetch data during startup of an automatic startup item of the operating system.

It is known to those of ordinary skilled in the art that after basic programs required during startup of the operating system is completed executing, automatic startup items of the operating system are started up. The loading process of the prefetch data in the embodiment of the present disclosure is performed during startup of the automatic startup items of the operating system.

The prefetch data corresponding to the target program is referred to the disk I/O (Input/Output) data for running the target program when the target program is started up. A large number of disk I/O may be performed during the startup of the program. If the storage areas of data read by a magnetic head are not continuous when the disk PO are performed, the vibration of the magnetic head may occurs, thereby significantly slowing down the speed of loading and slowing down the startup of the program. Therefore, the disk I/O data is loaded into the internal memory before the target program is started up, so that the disk I/O data may be directly accessed from the internal memory when running the target program, thereby reducing a startup time of the target program and accelerating the startup of the target program.

Furthermore, it may be ensured that the prefetch data is not removed or destroyed by locking the prefetch data after the prefetch data is loaded into the internal memory.

Step 103 may include unlocking the prefetch data corresponding to the target program in the case where a startup event of the target program is detected.

Step 104 may include accessing the prefetch data corresponding to the target program in the internal memory.

Step 105 may include running code of the target program according to the prefetch data corresponding to the target program to start up the target program.

In the Steps 103 to 105, the prefetch data corresponding to the target program is unlocked and the code of the target program is run in the case where the startup event of the target program is detected. The data required by each piece of code is loaded from the internal memory when the code is run, to start up the target program.

In the case where the prefetch data corresponding to the code to be run is already loaded into the internal memory, the prefetch data corresponding to the code may be directly accessed from the internal memory without performing the disk I/O, thereby reducing the startup time of the target program and accelerating the startup of the target program.

According to the method in the embodiment of the present disclosure, the target program which requires prefetch data is determined according to the history startup information of programs installed in the operating system, and the prefetch data of the target program is loaded into the internal memory in advance, so that the prefetch data may be directly accessed from the internal memory when the target program is started up, thereby avoiding a large number of disk I/Os, reducing the startup time of the target program and accelerating the startup of the target program. Moreover, it may be ensured that the prefetch data is not removed or destroyed by locking the prefetch data when the operating system runs.

In an embodiment of the present disclosure, the determining at least one target program according to history startup information of programs installed in the operating system in a prefetch database includes:
acquiring a preset number of target programs from the programs in a descending order of the number of times of startup of each of the programs within a first preset duration:
or,
determining, according to the number of times each of the programs starts up, a program whose number of times of startup is more than a preset times threshold as the target program.

In an embodiment of the present disclosure, the history startup information further includes the startup moments of the programs. And correspondingly, before the loading prefetch data corresponding to the target program into internal memory and locking the prefetch data in startup of an automatic startup item of an operating system, the method further includes:
acquiring an average startup moment of the target program according to the startup moments of the target program; and
determining a prefetch moment of the target program according to the average startup moment of the target program and a preset prefetch time of the target program.

Correspondingly, the loading prefetch data corresponding to the target program into internal memory and locking the prefetch data during startup of an automatic startup item of an operating system includes:
loading the prefetch data corresponding to the target program into the internal memory and locking the prefetch data at the prefetch moment of the target program, during the startup of the automatic startup item of the operating system.

Optionally, the method further includes:
updating the information of the programs which are installed in the operating system within a second preset duration, where the second preset duration may be set after the operating system starts up, or may be set before the operating system shuts down.

In an embodiment of the present disclosure, after the loading prefetch data corresponding to the target program into internal memory and locking the loaded data during startup of an automatic startup item of an operating system, the method further includes:
unlocking the prefetch data corresponding to the target program loaded in the internal memory in the case where the startup event of the target program is not detected within a timeout threshold starting from a moment at which the prefetch data corresponding to the target program is locked.

In an embodiment of the present disclosure, the timeout threshold of the target program is determined according to an earliest startup moment of the target program, a latest startup moment of the target program and a preset maximum timeout threshold of the target program as follows:

the timeout threshold of the target program=min (the preset maximum timeout threshold of the target program, the latest startup moment of the target program−the earliest startup moment of the target program).

Figure 2:
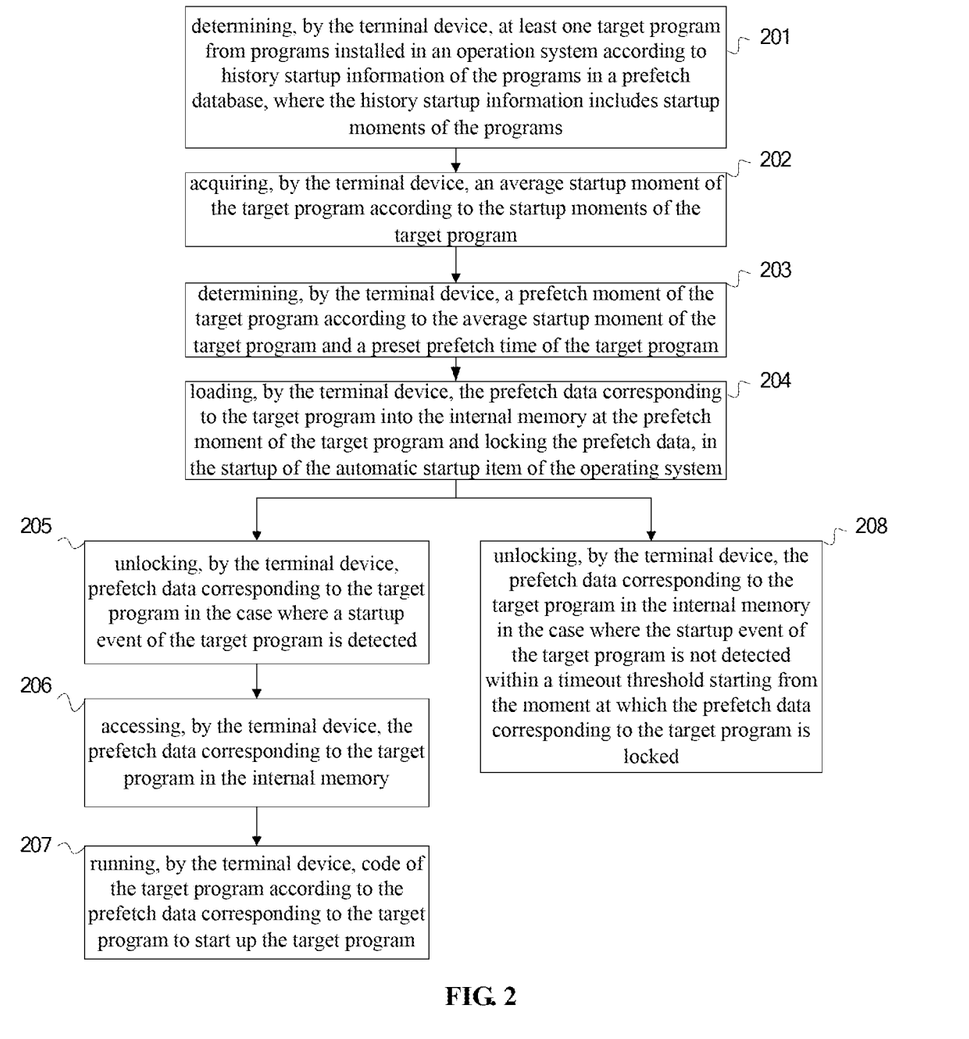
FIG. 2 is a flowchart of another program startup method according to an embodiment of the present disclosure.

FIG. 2 is a flowchart of another program startup method according to an embodiment of the present disclosure. The program startup method may be applied to a terminal device. Referring to FIG. 2, the method includes Steps 201 to 208.

Step 201 may include determining, by the terminal device, at least one target program from programs installed in an operation system according to history startup information of the programs in a prefetch database, where the history startup information includes startup moments of the programs.

In an embodiment of the present disclosure, the Step 201 may include: acquiring, by the terminal device, history startup information of the programs within a first preset duration from the history startup information of the programs in the prefetch database; and determining, by the terminal device, the target program according to the history startup information within the first preset duration. The history startup information may further include actual startup moments of the programs. The actual startup moment is referred to the actual moment at which the program starts up. For example, if the program A starts up at 12:00 on Mar. 3, 2013, the actual startup moment of the program A is 12:00 on Mar. 3, 2013. Thus, the number of times the program starts up within a certain duration may be obtain from the actual startup moment. For example, if the preset duration is 30 days, the number of times each of the programs starts up within 30 days before the current startup of the operating system may be obtained from the prefetch database, the target program is determined according to the number of times each of the programs starts up.

The first preset duration may either be set by technical personnel or be set by a user. The specific value of the first preset duration is not limited herein.

In an embodiment of the present disclosure, the determining at least one target program according to the history startup information within the first preset duration includes: acquiring a preset number of the target program from the programs in a descending order of the number of times each of the programs starts up within the first preset duration. For example, the history startup information of the programs A, B, C, and D within 30 days before the startup of the operating system is shown in Table 1.

TABLE 1

| program name | the number of startups | actual startup moments |
|---|---|---|
| A | 5 | TA1 ... TA5 |
| B | 19 | TB1 ... TB19 |
| C | 10 | TC1 ... TC10 |
| D | 22 | TD1 ... TD22 |

It can be seen from the Table 1 that the order of the number of times the each of the programs starts up within 30 days is: D>B>C>A. If the preset number of target programs is 2, the program D and the program B are determined as the target programs.

Alternatively, the determining the target program according to the history startup information within the first preset duration includes: determining the program whose number of times of startup is more than a preset times threshold as the target program, according to the number of times each of the programs starts up within the first preset duration. The explanation is made by way of example using the data in the Table 1, where the preset times threshold is 6. The program B, the program C and the program D are determined as the target programs because the numbers of times of the program B, the program C and the program D start up are all more than 6.

The preset number of target programs and the preset times threshold may either be set by technical personnel in advance or be adjusted by the user, which is not limited herein.

Step 202 may include acquiring, by the terminal device, an average startup moment of the target program according to the startup moments of the target program.

The average startup moment may either be acquired according to the startup moments of the target program within the first preset duration or be acquired according to the startup moments of the target program within a duration shorter than the first preset duration. If the first preset duration is 30 days, the target program is determined according to the number of startups within 30 days in Step 201. Moreover, the average startup moment of the target program may be determined from the startup moments of the target program within 30 days or 10 days, which is not limited herein.

Step 203 may include determining, by the terminal device, a prefetch moment of the target program according to the average startup moment of the target program and a preset prefetch time of the target program.

The prefetch data corresponding to the target program is required during startup of the automatic startup items of the operating system. The prefetch moment of the target program is determined to ensure that the prefetch data is prefetched before the target program starts up.

The prefetch moment of the target program is referred to a moment at which it is started to acquire the prefetch data corresponding to the target program with the startup moment of the terminal device as zero time. For the target program, in the case that the prefetch moment of the target program is too much earlier than the startup moment of the target program, the storage resource of the internal memory may be wasted. However, in the case that the prefetch moment of the target program is later than the startup moment of the target program, the target program may be started up in a low speed, thereby the startup can not be accelerated by using the prefetch data. Therefore, the startup moment of the target program is estimated according to the history startup information in the prefetch database, and the prefetch moment of the target program is determined according to the estimated startup moment of the target program, to obtain a shortest time interval between the prefetch moment and the startup moment. That is, it is ensured that the acquiring the prefetch data is completed before the target program starts up and that the storage resource of the internal memory is not wasted too much. In this way, the impact of acquiring the prefetch data on the operating system is reduced to a minimum.

In an embodiment of the present disclosure, the Step 203 may include: determining the prefetch moment of the target program which is preset prefetch time earlier than the average startup moment.

The preset prefetch time is referred to an estimated time which is spent on loading the prefetch data corresponding to the target program from the disk into the internal memory. The preset prefetch time may be estimated by technical personnel in advance according to the magnitude of the prefetch data and the speed of reading data, which is not limited herein.

Specifically, the average startup moment of the target program is determined as the estimated startup moment of the target program according to the history startup information in the prefetch database. It is determined that the prefetch moment of the target program which is preset prefetch time earlier than the average startup moment. In this way, it is started to acquire the prefetch data corresponding to the target program at the prefetch moment, and the acquiring the prefetch data is completed after a period of time equal to the preset prefetch time elapsed, and the estimated startup moment is reached. It is ensured that the time interval between the prefetch moment and the startup moment is the shortest, thereby the impact of acquiring prefetch data on the operating system is reduced to a minimum.

According to an embodiment of the present disclosure, the Step 203 may include: determining the prefetch moment of the target program which is preset prefetch time earlier than the average startup moment, and adjusting the prefetch moment of the target program according to the number of times of the target program starts up.

In the case where the number of time a target program starts up within the first preset duration is small, the possibility of startup of the target program may be small. If the prefetch moment of the target program is determined only according to the average startup moment and the preset prefetch time of the target program, the prefetch moment may be earlier than those of other target programs. However, the possibility of startup of the target program is very small. Therefore, in the case that the target program does not start up, the storage resource of the internal memory may be wasted. Therefore, the prefetch moment of the target program may be adjusted based on the number of times the target program starts up within the latest first preset duration. The specific adjusting algorithms are not limited herein, as long as it is ensured that the impact of the obtaining the prefetch data on the operating system is reduced to a minimum.

Step 204 may include loading, by the terminal device, the prefetch data corresponding to the target program into the internal memory at the prefetch moment of the target program and locking the prefetch data, during the startup of the automatic startup item of the operating system, and performing Step 205 or Step 208.

After the prefetch moment of the program is determined, the prefetch data corresponding to the target program is loaded in the internal memory at the prefetch moment of the target program, and the prefetch data is locked after the loading, to ensure that the prefetch data is not removed or destroyed.

Step 205 may include unlocking, by the terminal device, prefetch data corresponding to the target program in the case where a startup event of the target program is detected.

Step 206 nay include accessing, by the terminal device, the prefetch data corresponding to the target program in the internal memory.

Step 207 may include running, by the terminal device, code of the target program according to the prefetch data corresponding to the target program to start up the target program.

In the case where a startup event of the target program is detected, the prefetch data corresponding to the target program is unlocked, and the code of the target program is run according to the prefetch data corresponding to the target program in the internal memory, to start up the target program.

Step 208 may include unlocking, by the terminal device, the prefetch data corresponding to the target program in the internal memory in the case where the startup event of the target program is not detected within a timeout threshold starting from the moment at which the prefetch data corresponding to the target program is locked.

The timing is started from the moment at which the prefetch data corresponding to the target program is locked. If the startup event of the target program is not detected within the timeout threshold, it is determined that the target program does not start up within the timeout threshold. Therefore, the prefetch data corresponding to the target program is unlocked, in order to avoid occupying the storage resource of the internal memory for a long time.

In an embodiment of the present disclosure, the timeout threshold of the target program is determined according to an earliest startup moment of the target program, a latest startup moment of the target program and a preset maximum timeout threshold of the first target program as follows:

the timeout threshold of the target program=min (the preset maximum timeout threshold of the target program, the latest startup moment of the target program−the earliest startup moment of the target program).

The preset maximum timeout threshold may be set by technical personnel, which is not limited herein.

Specifically, in the case where the difference between the latest startup moment and the earliest startup moment is more than or equal to the preset maximum timeout threshold, the maximum timeout threshold is determined as the timeout threshold. In the case where the difference between the latest startup moment and the earliest startup moment is less than the preset maximum timeout threshold, the difference between the latest startup moment and the earliest startup moment is determined as the timeout threshold.

For example, Table 2 is a table of the history startup information provided in the embodiment of the present disclosure, which indicates the history startup information of the programs A, B, C and D within the latest 30 days.

TABLE 2

| Program name | the number of startups | average startup moment | earliest startup moment | latest startup moment |
|---|---|---|---|---|
| A | 5 | 55.2 s | 30 s | 88 s |
| B | 19 | 44.8 s | 42 s | 55 s |
| C | 10 | 58.3 s | 48 s | 63 s |
| D | 22 | 59.7 s | 52 s | 90 s |

The programs B and D are determined as the target programs according to the number of times the each of the programs starts up within 30 days. Taking the program D as an example, the average startup moment is 59.7 s. Assuming that the preset prefetch time of the program D is 10 s, the prefetch moment of the program D is 49.7 s, that is, 49.7 s elapsed after the startup of the operating system, it is started to load the prefetch data corresponding to the program D into the internal memory at 49.7 s. The earliest startup moment of the program D is 52 s, and the latest startup moment of the program D is 90 s, hence the difference between the latest startup moment and the earliest startup moment is 38 s. Assuming that the preset maximum timeout threshold is 60 s, the difference between the latest startup moment and the earliest startup moment is less than the preset maximum timeout threshold, and therefore the difference between the latest startup moment and the earliest startup moment is determined as the timeout threshold, that is, the timeout threshold is determined as 38 s. The average startup moment of the program D is 59.7 s. Assuming that the prefetch data is locked at the moment of $60^{th}$ second, if the startup event of the program D is not detected in the timeout threshold of 38 s, that is, the startup event of the program D has not been detected till the $98^{th}$ second, it is determined that the program D does not start up within the timeout threshold, and the prefetch data locked for the program D is unlocked.

In an embodiment of the present disclosure, after the above Step 201 to Step 208, the method further includes:

updating the startup information of the programs within a second preset duration. The updating the startup information of the programs may include: collecting startup information of the programs which are installed in the operating system within a second preset duration, and storing the collected startup information of the programs into the preset database.

Startup information of the programs which are installed in the operating system within the second preset duration is updated, to facilitate performing the above Step 201 to Step 208 again according to the updated history startup information when the operating system starts up next time, thereby accelerating the startup speed of the program.

Correspondingly, the earliest startup moment and the latest startup moment of each of the programs may change after the history startup information of the programs is updated, and the timeout threshold of each of the programs is re-determined according to the updated history startup information, that is, the timeout threshold of each of the programs may be dynamically changed with the updating startup information of each of the programs.

The updating the startup information of the programs may either be performed after the operating system starts up or be performed before the operating system shuts down. The re-determination of the timeout threshold of each of the programs may be performed after updating the startup information of the programs, which is not limited herein.

According to the method of the embodiment of the present disclosure, the target program which requires prefetch data and the prefetch moment of the target program are determined according to the history startup information of the programs; and the prefetch data of the target program is loaded into the internal memory according to the prefetch moment of the target program, so that the prefetch data is directly accessed from the internal memory when the target program starts up, thereby avoiding a large number of disk I/O, reducing the startup time of the target program and accelerating the startup of the target program. Moreover, it may be ensured that the prefetch data is not placed or destroyed by locking the prefetch data when an operating system operates. Furthermore, it may also be ensured that the time interval between the prefetch moment and the startup moment of the target program is the minimum, thereby the impact of obtaining the prefetch data on the operating system is reduced to a minimum.

Figure 3:
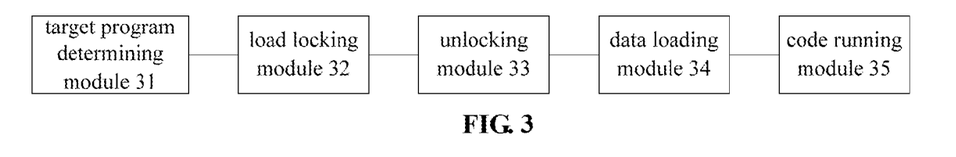
FIG. 3 is a schematic structural diagram of a program startup apparatus according to an embodiment of the present disclosure.

FIG. 3 is a schematic structural diagram of a program startup apparatus according to an embodiment of the present disclosure. The program startup apparatus may be applied to a terminal device. Referring to FIG. 3, the apparatus includes a target program determining module 31, a load locking module 32, an unlocking module 33, a data loading module 34 and a code running module 35.

The target program determining module 31 is configured to determine at least one target program from programs according to history startup information of the programs in a prefetch database, where the history startup information includes startup moments of the programs. The load locking module 32 is connected to the target program determining module 31 and is configured to load prefetch data corresponding to the target program into an internal memory and lock the prefetch data in startup of an automatic startup item of an operating system. The unlocking module 33 is connected to the load locking module 32 and is configured to unlock the prefetch data corresponding to the target program in the case where a startup event of the target program is detected. The data loading module 34 is connected to the unlocking module 33 and is configured to access the prefetch data corresponding to the target program in the internal memory. The code running module 35 is connected to the data loading module 34 and is configured to run code of the target program according to the prefetch data corresponding to the target program to start up the target program.

In an embodiment of the present disclosure, the target program determining module 31 may include:
  an order determining unit, configured to acquire a preset number of the target programs from the programs in a descending order of the number of times each of the programs starts up within a first preset duration; or
  a times threshold determining unit, configured to determine, according to the number of time each of the programs starts up within the first preset duration, a program whose number of times of startup is more than a preset times threshold as the target program.

In an embodiment of the present disclosure, the history startup information further includes the startup moments of the program, and correspondingly, the apparatus further includes:
  an average acquiring module, configured to acquire an average startup moment of the target program according to the startup moments of the target program; and
  a moment determining module, configured to determine a prefetch moment of the program according to the average startup moment and a preset prefetch time of the target program;
  and correspondingly, the load locking module 32 is configured to load the prefetch data corresponding to the target program into the internal memory and lock the prefetch data at the prefetch moment of the target program, during the startup of the automatic startup item of the operating system.

In an embodiment of the present disclosure, the apparatus further includes:
  an information updating module, configured to update the startup information of programs which is installed in the operating system within a second preset duration.

In an embodiment of the present disclosure, the apparatus further includes:
  a startup timeout module, configured to unlock the prefetch data corresponding to the target program loaded in the internal memory in the case where the startup event of the target program is not detected within a timeout threshold starting from a moment at which the prefetch data corresponding to the target program is locked.

In an embodiment of the present disclosure, the timeout threshold of each target program is determined according to an earliest startup moment of the target program, a latest startup moment of the target program and a preset maximum timeout threshold of the target program as follows:

the timeout threshold of the target program=min (the preset maximum timeout threshold of the target program, the latest startup moment of the target program−the earliest startup moment of the target program).

According to the apparatus of the embodiments of the present disclosure, the target program which requires prefetch the data and the prefetch moment of the target program are determined according to the history startup information of the programs; and the prefetch data of the target program is loaded into the internal memory according to the prefetch moment of the target program, so that the prefetch data is directly accessed from the internal memory when the target program starts up, thereby avoiding a large number of disk I/O, reducing the startup time of the target program and accelerating the startup of the target program. Moreover, it is ensured that the prefetch data is not removed or destroyed by locking the prefetch data that when an operating system operates. Furthermore, it can also be ensured that the time interval between the prefetch moment and the startup moment of the target program is the minimum, thereby the impact of obtaining the prefetch data on the operating system is reduced to a minimum.

It should be noted that the program startup apparatus according to the above embodiment is explained by taking a division of above function modules as an example when the apparatus starts up. In practice, the above functions may be distributed to different function modules as required, that is, the internal structure of the terminal device is divided into different function modules to complete all or part of the functions described above. In addition, the program startup apparatus according to the above embodiment has the same concept with the program startup method embodiment. Therefore, for the specific implementation process of the program startup apparatus, the method embodiment may be referred to, which is omitted herein.

Figure 4:
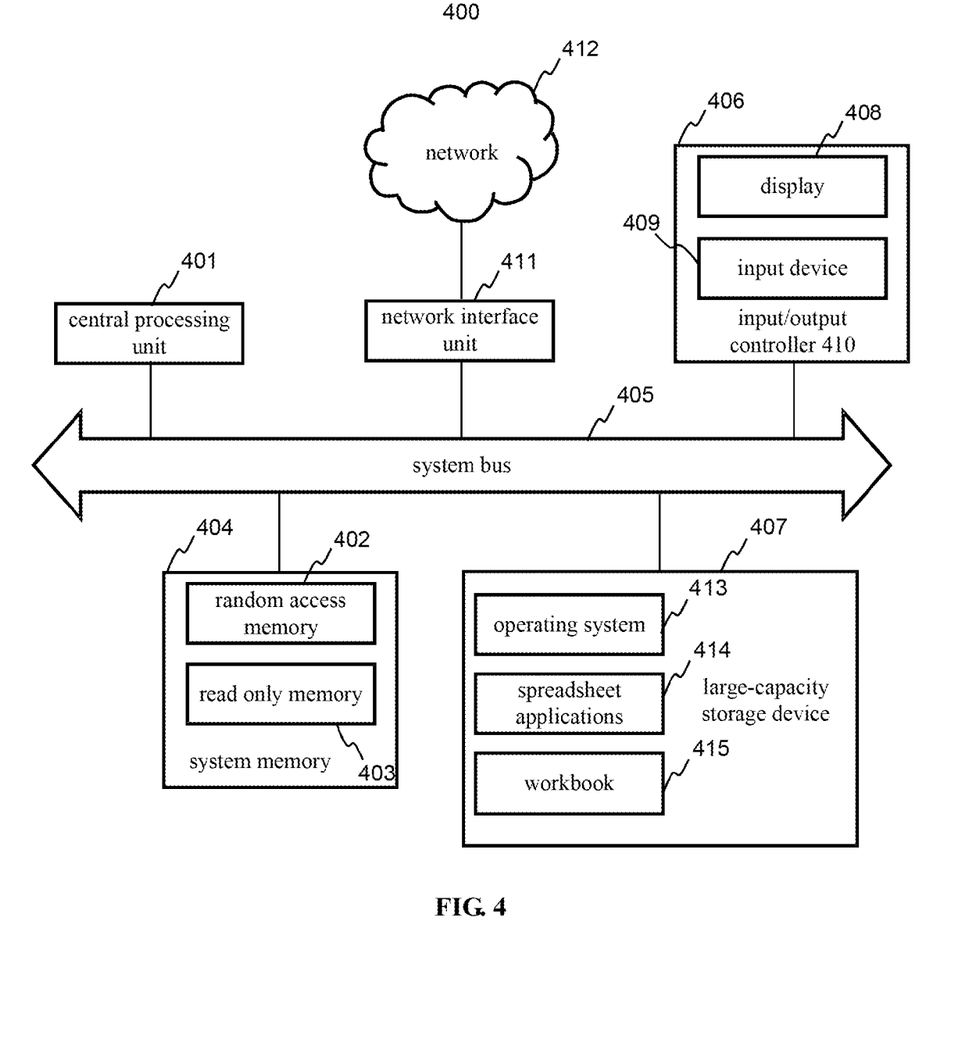
FIG. 4 is a schematic structural diagram of a terminal according to an embodiment of the present disclosure.

Since the embodiments of the present disclosure are usually implemented with a computing environment, a computer system or hardware, FIG. 4 and the description thereof are intended to briefly and broadly describe suitable computing environments in which the embodiments of the present disclosure may be implemented. Although an embodiment of the present disclosure is described in FIG. 4 by using the computing environment executed in a server or a personal computer system as a general environment, those of ordinary skilled in the art may recognize that the embodiment of the present disclosure may be implemented with other types of computer systems and program modules.

Generally, the program module includes routines, programs, components, data structures and other types of structures for performing particular tasks or implementing particular abstract data types. Moreover, those of ordinary skilled in the art may appreciate that the embodiment of the present disclosure may be implemented with a computer system configuration such as handheld devices, multi-processor systems, microprocessor-based or programmable consumer electronics, minicomputers and mainframe computers. Furthermore, the embodiment of the present disclosure may also be implemented in a distributed computing environment, and the tasks may be carried out with a remote processing device connected via a network. In the distributed computing environment, the program modules may be positioned in either a local storage device or a remote storage device.

FIG. 4 is a schematic structural diagram of a terminal according to an embodiment of the present disclosure. A computer 400 is a conventional laptop notebook or a conventional desktop computer. The computer 400 includes a central processing unit (CPU) 401, a system memory 404 including a random access memory (RAM) 402 and a read only memory (ROM) 403, and a system bus 405 for connecting the system memory 404 and the central processing unit 401. The computer 400 further includes a basic input/output system (I/O system) 406 for transmitting information between various components of the computer and a large-capacity storage device 407 for storing the operating system, applications and other program modules.

The basic input/output system 406 includes a display 408 for displaying information and an input device 409 such as a mouse and a keyboard for inputting information by users. The display 408 and the input device 409 are connected to the central processing unit 401 through an input and output controller 410 connected to the system bus 405. The basic input/output system 406 may further includes the input and output controller 410 to receive and process input data from multiple other devices such as the keyboard, the mouse or electronic stylus. Similarly, the input and output controller 410 provides output data to a screen, a printer or other types of output devices.

The large-capacity storage device 407 is connected to the central processing unit 401 through a large-capacity storage controller (not shown) connected to the system bus 405. The large-capacity storage device 407 and computer readable media associated thereof provide nonvolatile storage to the computer 400. That is, the large-capacity storage device 407 may include computer readable media (not shown) such as hard disks or CD-ROM drives.

Without loss of generality, the computer readable media may include computer storage media and communication media. The computer storage media include volatile and nonvolatile, removable and non-removable media implemented by any method or technology for storing information such as computer readable instructions, data structures, program modules or other data. The computer storage media include RAM, ROM, EPROM, EEPROM, flash memory or other solid state memory, CD-ROM, DVD, or other optical storage, magnetic tape cassettes, magnetic tape, magnetic disk storage or other magnetic storage devices. Of course, those of ordinary skilled in the art may realize that the computer storage media are not limited to the several types of media described above.

According to the embodiments of the present disclosure, the computer 400 may also be executed by a remote computer connected on the network through the network such as the Internet. That is, the computer 400 may be connected to the network 412 through a network interface unit 411 connected to the system bus 405, or the computer 400 may also be connected to other type of network or remote computer system (not shown) through the network interface unit 411.

The terminal device further includes a program, where the program is stored in the system memory 404, and the center processing unit 401 is configured to implement a program startup method by executing the program, where the program includes instructions for:

determining at least one target program from programs according to history startup information of the programs in a prefetch database, where the history startup information includes startup moments of the programs;

loading prefetch data corresponding to the target program into internal memory and locking the prefetch data during startup of an automatic startup item of an operating system;

unlocking the prefetch data corresponding to the target program in the case where a startup event of the target program is detected;

accessing the prefetch data corresponding to the target program in the internal memory; and running code of the target program according to the prefetch data corresponding to the target program to start up the target program.

Optionally, the one or more programs further includes instructions for:

acquiring a preset number of target programs from the programs in a descending order of the number of times each of the programs starts up within a first preset duration; or, determining, according to the number of times each of the programs starts up within the first preset duration, the program whose number of times of startup is more than a preset times threshold as the at the target program.

Optionally, the program further includes instructions for:

acquiring an average startup moment of the target program according to the startup moments of the target program; and determining a prefetch moment of the target program according to the average startup moment and a preset prefetch time of the target program;

correspondingly, the program further includes instructions for:

loading the prefetch data corresponding to the target program into the internal memory and locking the prefetch data at the prefetch moment of the target program, during the startup of the automatic startup item of the operating system.

The program further includes instructions for:

updating the startup information of the programs within a second preset duration.

The program further includes instructions for:

unlocking the prefetch data corresponding to the target program loaded in the internal memory in the case where the startup event of the target program is not detected within a timeout threshold starting from a moment at which the prefetch data corresponding to the target program is locked.

Where, the timeout threshold of the target program is determined according to an earliest startup moment of the target program, a latest startup moment of the target program and a preset maximum timeout threshold of the target program as follows:

> the timeout threshold of the target program=min (the preset maximum timeout threshold of the target program, the latest startup moment of the target program−the earliest startup moment of the target program).

Those of ordinary skilled in the art may understand that all or part of the steps achieving the above embodiments may either be carried out by hardware (such as a processor) or be carried out by relevant hardware instructed by programs. The programs may be stored in a non-transitory computer readable storage media. The aforementioned storage media may be a read only memory, a magnetic disk, an optical disk or the like.

The description above is only the preferred embodiments of the present disclosure, and is not intended to limit the disclosure. Any modifications, equivalent substitutions, improvements or the like that are made within the spirit and principle of the disclosure all fall within the scope of protection of the disclosure.

The invention claimed is:

1. A program startup method, comprising:
   determining at least one target program from a plurality of programs according to history startup information of the plurality of programs in a prefetch database, wherein the history startup information comprises startup moments of the plurality of programs;
   acquiring an average startup moment of the at least one target program according to the startup moments of the at least one target program;
   determining a prefetch moment of the at least one target program according to the average startup moment of the at least one target program and a preset prefetch time of the at least one target program;
   loading prefetch data corresponding to the at least one target program into an internal memory, and locking the loaded prefetch data in a startup of an automatic startup item of an operating system;
   unlocking the loaded prefetch data corresponding to a first target program when a startup event of the first target program is detected, wherein the first target program is one of the at least one target program;
   accessing the loaded prefetch data corresponding to the first target program in the internal memory; and
   running codes pertaining to the first target program according to the loaded prefetch data corresponding to the first target program in order to start up the first target program.

2. The method according to claim 1, wherein the determining of the at least one target program according to history startup information of the plurality of programs in the prefetch database comprises:
   acquiring a preset number of at least one target programs from the plurality of programs in descending order on a number of times each of the plurality of programs starts up within a first preset duration;
   or,
   determining, according to the number of times each of the plurality of programs starts up, a program whose number of times of startup is more than a preset times threshold as the at the at least one target program.

3. The method according to claim 1, wherein the loading prefetch data corresponding to the target program into the internal memory and the locking of the prefetch data in the startup of the automatic startup item of an operating system comprises:
   loading the prefetch data corresponding to the at least one target program into the internal memory and locking the prefetch data at the prefetch moment of the at least one target program, in the startup of the automatic startup item of the operating system.

4. The method according to claim 1, wherein the method further comprises:
   updating the startup information of the plurality of programs within a second preset duration.

5. The method according to claim 1, wherein after the loading prefetch data corresponding to the at least one target program into internal memory and locking the prefetch data in startup of an automatic startup item of an operating system, the method further comprises:
   unlocking the prefetch data corresponding to a second target program loaded in the internal memory when the startup event of the second target program is not detected within a timeout threshold starting from a moment at which the prefetch data corresponding to the second target program is locked, wherein the second target program is one of the at least one target program.

6. The method according to claim 5, wherein the timeout threshold of the second target program is determined according to an earliest startup moment of the second target program, a latest startup moment of the second target program and a preset maximum timeout threshold of the second target program as follows:

> the timeout threshold of the second target program=min(the preset maximum timeout threshold of the second target program, the latest startup moment of the second target program−the earliest startup moment of the second target program).

7. A program startup apparatus, comprising at least one processor and a memory having processor-executable instructions stored therein, and the instructions when executed by the at least one processor, configure the apparatus to:
   determine at least one target program from a plurality of programs according to history startup information of the plurality of programs in a prefetch database, wherein the history startup information comprises startup moments of the plurality of programs;
   acquire an average startup moment of the at least one target program according to the startup moments of the at least one target program;
   determine a prefetch moment of the at least one target program according to the average startup moment of the at least one target program and a preset prefetch time of the at least one target program;
   load prefetch data corresponding to the at least one target program into internal memory and lock the prefetch data in startup of an automatic startup item of an operating system;
   unlock the prefetch data corresponding to a first target program in the case where a startup event of the first target program is detected, wherein the first target program is one of the at least one target program;
   access the prefetch data corresponding to the first target program in the internal memory; and
   run code of the first target program according to the prefetch data corresponding to the first target program to start up the first target program.

8. The apparatus according to claim 7, wherein the apparatus is further configured to:
  acquire a preset number of the target programs from the plurality of programs in a descending order of the number of times each of the plurality of programs starts up within a first preset duration;
  or,
  determine, according to the number of times each of the plurality of programs starts up, a program whose number of times of startup is more than a preset times threshold as the at least one target program.

9. The apparatus according to claim 7, wherein the apparatus is further configured to load the prefetch data corresponding to the at least one target program into the internal memory and lock the loaded data at the prefetch moment of the at least one target program, in the startup of the automatic startup item of the operating system.

10. The apparatus according to claim 7, wherein the apparatus further configured to:
  update the startup information of the plurality of programs within a second preset duration.

11. The apparatus according to claim 7, wherein the apparatus further comprises:
  a startup timeout module, configured to unlock the prefetch data corresponding to a second target program loaded in the internal memory in the case where the startup event of the second target program is not detected within a timeout threshold starting from a moment at which the prefetch data corresponding to the second target program is locked, wherein the second target program is one of the at least one target program.

12. The apparatus according to claim 11, wherein the timeout threshold of the second target program is determined according to an earliest startup moment of the second target program, a latest startup moment of the second target program and a preset maximum timeout threshold of the second target program as follows:

the timeout threshold of the second target program=min(the preset maximum timeout threshold of the second target program, the latest startup moment of the second target program–the earliest startup moment of the second target program).

13. A terminal comprising a memory and a program, wherein the program is stored in the memory, and wherein a processor is configured to implement a program startup method by executing the program;
  wherein the program comprises instructions for:
  determining at least one target program from a plurality of programs according to startup moments of the plurality of programs in a prefetch database;
  acquiring an average startup moment of the at least one target program according to the startup moments of the at least one target program;
  determining a prefetch moment of the at least one target program according to the average startup moment of the at least one target program and a preset prefetch time of the at least one target program;
  loading prefetch data corresponding to the at least one target program into internal memory and locking the loaded data in startup of an automatic startup item of an operating system;
  unlocking the prefetch data corresponding to a first target program when a startup event of the first target program is detected, wherein the first target program is one of the at least one target program;
  accessing the prefetch data corresponding to the first target program in the internal memory; and
  running code of the first target program according to the prefetch data corresponding to the first target program to start up the first target program.

* * * * *